(12) United States Patent
Seethaler et al.

(10) Patent No.: US 8,898,461 B2
(45) Date of Patent: Nov. 25, 2014

(54) BATTERY AUTHENTICATION METHOD AND APPARATUS

(75) Inventors: Kenneth Scott Seethaler, Wake Forest, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 813 days.

(21) Appl. No.: 13/039,371

(22) Filed: Mar. 3, 2011

(65) Prior Publication Data

US 2012/0223671 A1 Sep. 6, 2012

(51) Int. Cl.
| | |
|---|---|
| *H02J 7/00* | (2006.01) |
| *H04L 9/00* | (2006.01) |
| *H04L 9/32* | (2006.01) |
| *G06F 21/00* | (2013.01) |
| *G06F 21/81* | (2013.01) |
| *G06F 21/44* | (2013.01) |

(52) U.S. Cl.
CPC ................ *G06F 21/81* (2013.01); *G06F 21/44* (2013.01); *H02J 2007/0001* (2013.01); *H04L 9/3271* (2013.01)
USPC .............. 713/168; 713/170; 726/26; 320/106

(58) Field of Classification Search
None
See application file for complete search history.

(56) References Cited

U.S. PATENT DOCUMENTS

| | | | | |
|---|---|---|---|---|
| 5,544,246 | A | * | 8/1996 | Mandelbaum et al. ......... 705/65 |
| 5,892,900 | A | | 4/1999 | Ginter et al. |
| 6,975,092 | B2 | | 12/2005 | Edington et al. |
| 7,613,924 | B2 | | 11/2009 | Shankar et al. |
| 7,667,429 | B2 | | 2/2010 | Little |
| 7,779,220 | B1 | * | 8/2010 | Pione ................ 726/34 |
| 2001/0025225 | A1 | | 9/2001 | Ota et al. |
| 2002/0009059 | A1 | * | 1/2002 | Abutaleb et al. ............. 370/318 |
| 2002/0012541 | A1 | | 1/2002 | Takemoto et al. |
| 2002/0082891 | A1 | | 6/2002 | McKay et al. |
| 2002/0107809 | A1 | | 8/2002 | Biddle et al. |
| 2003/0088448 | A1 | | 5/2003 | Tan |
| 2004/0006544 | A1 | | 1/2004 | Gulett |
| 2004/0111304 | A1 | | 6/2004 | Meka et al. |
| 2004/0157555 | A1 | | 8/2004 | Richenstein et al. |
| 2005/0001589 | A1 | * | 1/2005 | Edington et al. .............. 320/128 |
| 2005/0010782 | A1 | | 1/2005 | Ohkubo |
| 2006/0149673 | A1 | * | 7/2006 | Delefevre ........................ 705/44 |
| 2006/0149966 | A1 | | 7/2006 | Buskey et al. |
| 2006/0204004 | A1 | * | 9/2006 | Shankar et al. ................. 380/44 |
| 2006/0230276 | A1 | | 10/2006 | Nochta |
| 2007/0050627 | A1 | | 3/2007 | Chiku |

(Continued)

FOREIGN PATENT DOCUMENTS

GB 2239567 A * 7/1991

OTHER PUBLICATIONS

Infineon, Origa SLE95050 Original Product Authentication and Brand Protection Solution, Version 1.50, Jun. 2009.

*Primary Examiner* — Peter Poltorak
*Assistant Examiner* — Walter Malinowski
(74) *Attorney, Agent, or Firm* — Ference & Associates LLC

(57) ABSTRACT

Improved handling of battery recognition tasks in an electronic device such as a cell phone, smart phone, computer system, recording device or others is facilitated. Recognition of a battery so as to enable exchange of power between the device and the battery is determined by a match between one of a plurality of number strings stored in the device and the decrypted response to an encrypted challenge derived from the one of stored number string.

16 Claims, 3 Drawing Sheets

(56) References Cited

U.S. PATENT DOCUMENTS

| | | | |
|---|---|---|---|
| 2007/0189516 A1* | 8/2007 | Lee | 713/189 |
| 2008/0037779 A1* | 2/2008 | Seman et al. | 380/46 |
| 2008/0256370 A1* | 10/2008 | Campbell et al. | 713/300 |
| 2010/0268946 A1* | 10/2010 | Taylor | 713/168 |
| 2011/0093714 A1* | 4/2011 | Schaecher et al. | 713/176 |
| 2012/0239555 A1* | 9/2012 | Seethaler et al. | 705/39 |

* cited by examiner

US 8,898,461 B2

BATTERY AUTHENTICATION METHOD AND APPARATUS

FIELD AND BACKGROUND OF INVENTION

Many electronic devices accommodate exchange of electrical power both with a line power source (supplied by an electrical utility) and with a supporting battery. Such devices include telephones such as cell phones and so-called smartphones, computer systems, recording devices and others known to persons of skill in the applicable arts. In the discussion which follows, the term electronic device is used as a generic identifier, while other more system specific identifiers are used in a non-limiting way for purposes of clarity only. For the manufacturers of such devices, it is important that the interaction of a device with a battery meet the original specifications in the design of the device. This is significant for purposes of safety (as an improper battery presents known hazards) as well as product performance and customer satisfaction.

Many battery manufacturers produce batteries which meet the physical interface requirement to be fitted to various electronic devices manufactured by others, as there is a significant after market for such batteries. That is, such a device may be sold by a device manufacturer with a battery which meets design specifications and which may ultimately lose usefulness. In such an event, the user of the electronic device will seek a replacement battery, either from the device manufacturer or from an after market battery supplier. In making such a choice, there is a risk that the replacement battery will not meet specifications or will present hazards if used.

Provision has been made heretofore for controlling device and battery interaction by having a "handshake" or recognition function which enables an electronic device to recognize an acceptable battery and enable exchange of electrical power with such a battery while blocking such an exchange with an unrecognized battery. The exchange of electrical power may be discharging the battery to power the device or charging the battery or both. It is common for electrical devices of the types here discussed to have provisions for battery discharge and charge control, as will be known to persons of skill in the applicable arts.

SUMMARY OF THE INVENTION

The technology here described facilitates improved handling of battery recognition tasks in an electronic device of the types described. As will be described more fully hereinafter, what is here contemplated are arrangements in which a plurality of specific batteries may be equally given recognition qualities by the electronic device to which they may be fitted. Other and further arrangements are described in the specification which follows.

BRIEF DESCRIPTION OF DRAWINGS

Some of the characteristics of the technology having been described, others will appear as the description proceeds, when taken in connection with the accompanying drawings, in which.

DETAILED DESCRIPTION OF INVENTION

While the present technology will be described more fully hereinafter with reference to the accompanying drawings, in which a preferred embodiment of the present technology is shown, it is to be understood at the outset of the description which follows that persons of skill in the appropriate arts may modify what is here described while still achieving the favorable results desired. Accordingly, the description which follows is to be understood as being a broad, teaching disclosure directed to persons of skill in the appropriate arts, and not as limiting upon the protection sought.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
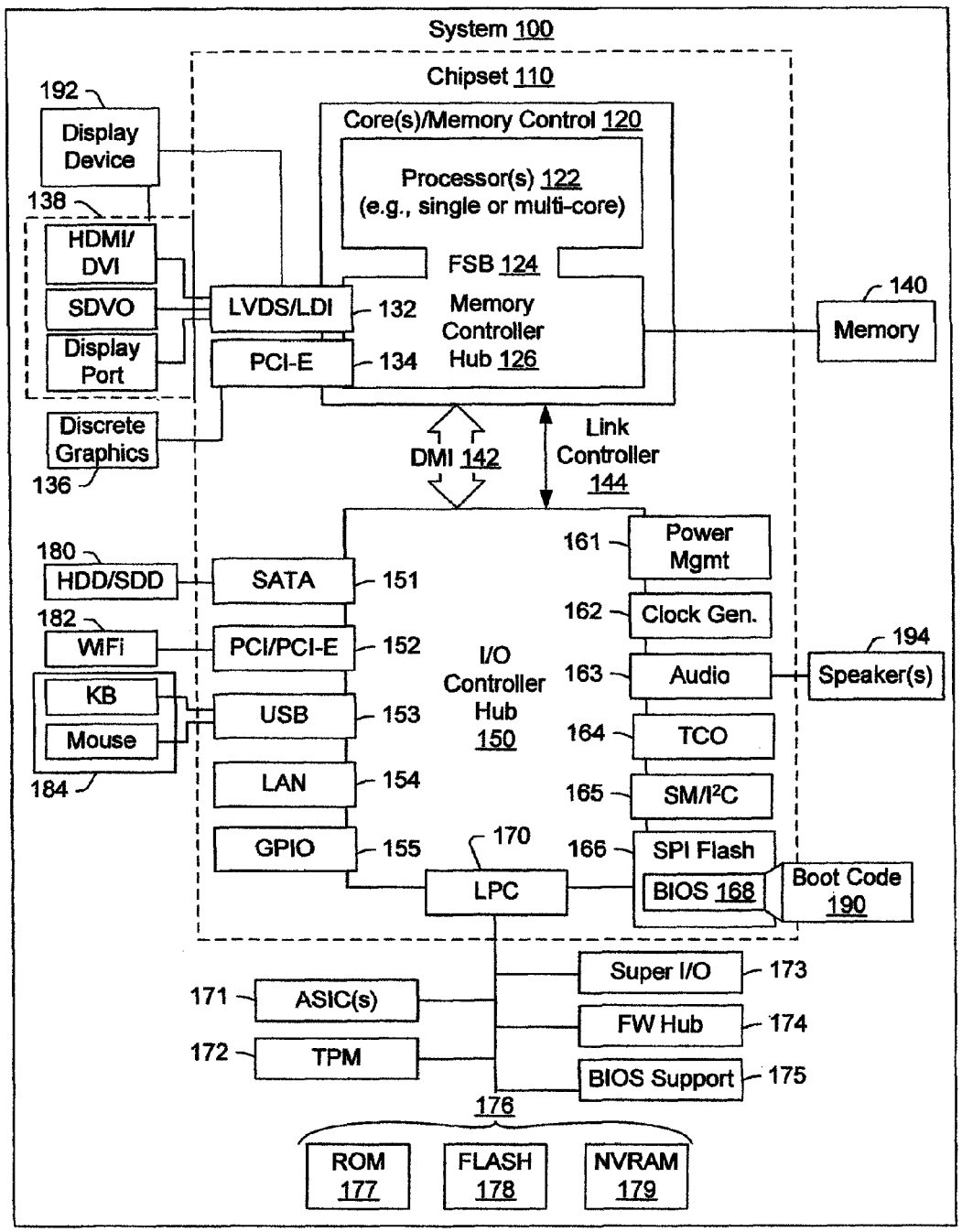
FIG. 1 is a illustration of an electronic device in the form of a computer system.

While various exemplary circuits or circuitry are discussed, FIG. 1 depicts a block diagram of an illustrative exemplary computer system 100. The system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system 100. The computer system 100, when configured as a portable system of the types known as a notebook or netbook computer, will accommodate being powered either by a line voltage as derived from an electric utility or by a battery. Further, the system will exchange electrical power with the battery either by drawing power from the battery, charging the battery while connected to line voltage, or both.

The system 100 of FIG. 1 includes a so-called chipset 110 (a group of integrated circuits, or chips, that work together, chipsets) with an architecture that may vary depending on manufacturer (e.g., INTEL®, AMD®, etc.). The architecture of the chipset 110 includes a core and memory control group 120 and an I/O controller hub 150 that exchange information (e.g., data, signals, commands, etc.) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (e.g., single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (e.g., to provide support for a type of RAM that may be referred to as "system memory"). The memory controller hub 126 further includes a LVDS interface 132 for a display device 192 (e.g., a CRT, a flat panel, a projector, etc.). A block 138 includes some technologies that may be supported via the LVDS interface 132 (e.g., serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (e.g., for HDDs, SDDs, etc.), a PCI-E interface 152 (e.g., for wireless connections 182), a USB interface 153 (e.g., for input devices 184 such as keyboard, mice, cameras, phones, storage, etc.), a network interface 154 (e.g., LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (e.g., for speakers 194), a TCO interface 164, a system management bus interface 165, and SPI Flash 166, which can include BIOS 168 and boot code 190. The I/O hub controller 150 may include gigabit Ethernet support.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168. As described herein, a device may include fewer or more features than shown in the system 100 of FIG. 1.

It is known that a computer system as illustrated in FIG. 1 may support a plurality of states of power management through the power management interface 161. Such a system (or other electronic device) may have four states of power management: a normal operating state, a standby state, a hibernation state, and an off state. The standby state is characterized by devices, such as a video controller and a hard drive, being placed into a low-power mode transparent to the operating system and the applications executing on the computer system. The hibernation state is characterized by executing code being interrupted and the state of the computer system being saved to a file on the hard drive in such a manner that system power may be removed after the state of the computer system is saved to the hard drive. Later, after system power is restored, the state of the computer system is resumed by reading from the hard drive and loading it in such a manner that the operating system and application programs are not adversely affected. The normal operating state and the off state correspond to the typical on and off states of computer systems lacking such multiple state of power management. Transition from one state to another is variously controlled by passage of time or manipulation of manual switches or by remote actuation through a network adapter. In some known systems, the hibernate state is known as S3; hibernation as S4; and power off as S5. Transitions among the various power states can and will occur when the system is powered by line voltage and by a battery.

The technology which is the focus of this description contemplates operation of the computer system in accordance with a process in which the system accommodates line and battery power, has a first cryptographic element and stores a plurality of digitally encoded number strings. As will be made more clear hereinafter, these number strings are stored within memory of the system accessible to the system processor and code stored in the system which manipulates the number string in a particular manner. The technology anticipates the coupling to the computer system of a battery which has a second cryptographic element. While the battery is coupled, there is an exchange of encrypted messages derived from one of the number strings between cooperating first and second cryptographic elements wherein a matched exchange enables the computer system to recognize the battery and exchange electrical power with the recognized battery.

As used herein, the phrase "matched exchange" has a particular meaning. A matched exchange occurs when a number string originating from one of the system and the battery is transmitted to the other in an encrypted form, decrypted where received and compared to a previously established number string, encrypted for return transmission, and when decrypted matches the originating number string. Such encryption is asymmetrical, using paired public and private keys. Public-key cryptography refers to a method for transforming a message, including a number string, into a form that can be read only by an intended recipient. This cryptographic approach involves the use of asymmetric key algorithms. The non-message information (the public key) needed to transform the message to a secure form is different from the information needed to reverse the process (the private key).

Preferably, a public key is stored in the computer system and a private key is stored in a battery which can be coupled to the computer system, about which more will be said later. The plurality of number strings stored in the computer system are encrypted using the public key and may be communicated to the battery as an encrypted number string. The encrypted number string is then decrypted in the battery using the private key and the unencrypted number string returned to the system. If the returned number matches a number string stored in the system, then a matched exchange has occurred and the battery is recognized. In the event that there is no returned string or the returned string does not match, then the matched exchange fails and the electronic device will block the exchange of power with the unrecognized battery. The electronic device responds to a transition from one power state to another power state by initiating an exchange of encrypted messages and selects from among a plurality of stored encrypted number strings differing ones of the encrypted number strings to be used in exchanges initiated on successive transitions from one power state to another power state.

Figure 2:
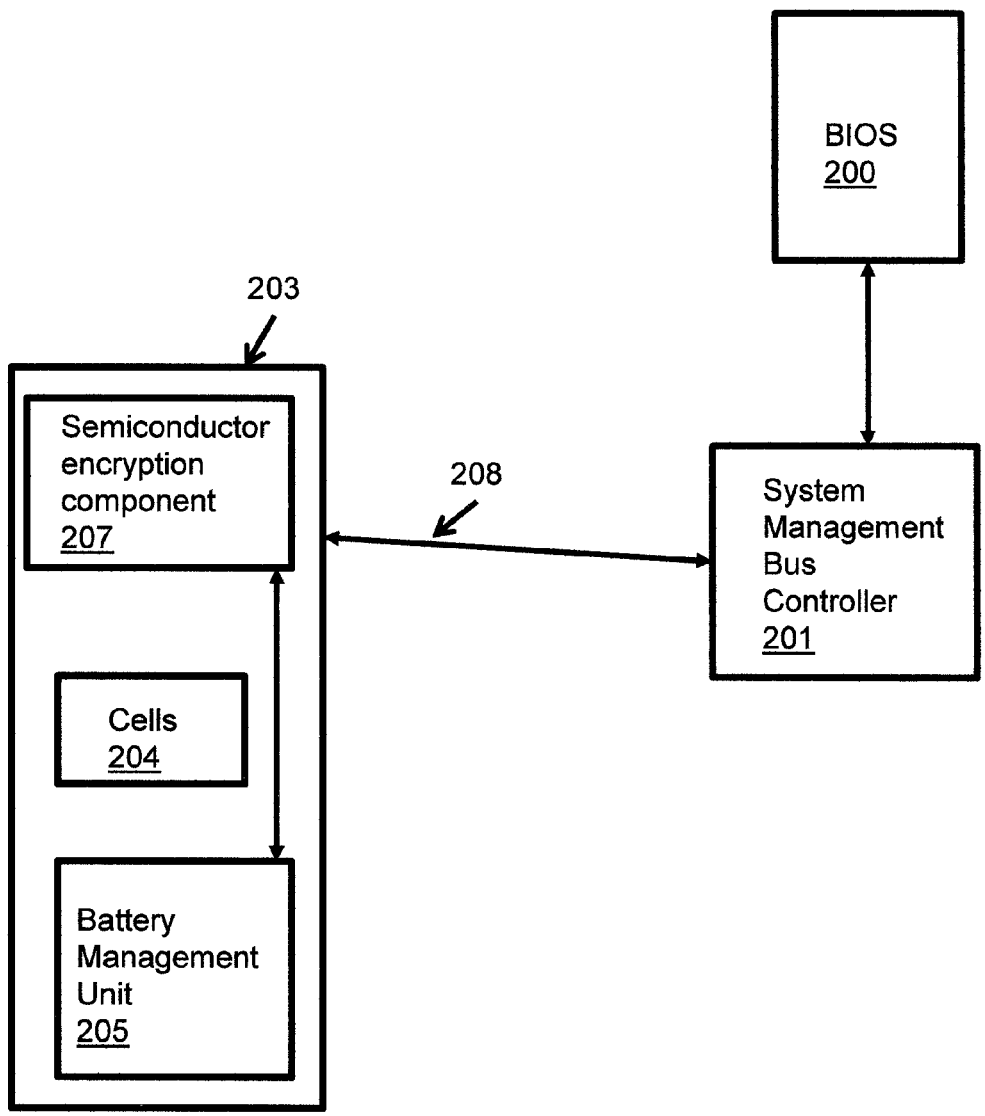
FIG. 2 is an illustration of the interconnections and interactions between an electronic device such as the computer system of FIG. 1 and a supporting battery.

Referring now to FIGS. 1 and 2, the drawings represent the elements involved in the exchange. A list of a plurality of digitally encoded number strings is maintained in or accessibly to the BIOS 200 which identify batteries to be recognized for the system. A public encryption key is also maintained. On each power state transition, each of the number strings is encrypted using the public key to create a list of challenges (the encrypted number strings) and responses (the original number strings, as decrypted using the paired private key) and store the challenge/response strings accessibly to the system management bus controller 201. An encrypted number string to be used as a challenge becomes a number used once, also known as a nonce. Because the number strings are stored in the controller 201, the numbers are available for a challenge/response on any change of batteries in addition to power state transitions. The advantage of the cached numbers is that the controller 201 may manage new battery insertions while system operation continues.

A battery 203 to be coupled to the system has cells 204, a battery management unit 205 and a semiconductor component 207 which stores the private key. When a challenge arrives at the battery, the semiconductor component supplies the private key used to decrypt the challenge. The challenge is communicated to the battery management unit 205 through the system management bus 208, the response (the decrypted original number string) is generated using the private key stored in the semiconductor component 207, and returned through the bus 208.

In the event that the response matches the original number string, the battery is recognized and enabled for power exchange, discharging, charging or both. In the event there is no response or the response fails to match the original number string, the match fails, the battery is not recognized, and the exchange of power with the battery is blocked.

Figure 3:
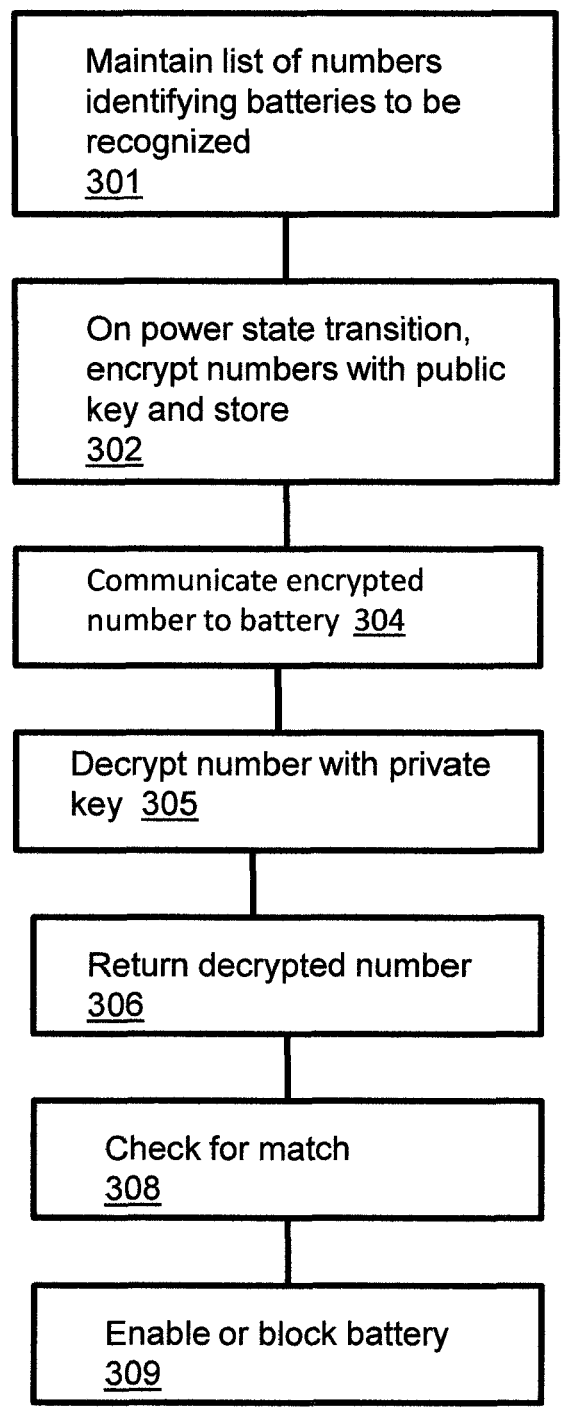
FIG. 3 is a flow chart representation of interactions between an electronic device such as the computer system of FIG. 1 and batteries supplied as original equipment with the device, supplied as after market authorized batteries; and supplied as after market unauthorized batteries.

The sequences are illustrated in FIG. 3. To restate, a list of number strings identifying batteries to be recognized is maintained as at 301. On a power state transition, those numbers are encrypted with the public key at 302 and communicated to a battery at 304 (the "challenge"). This can occur, for example, should a battery be changed during operation of the system or should a second battery be coupled to a system which accommodates such connections or should a change be made at a docking station. At the battery, the encrypted number is decrypted using the private key at 305 and returned to the system (the "response") at 306. The system then checks for a match (308) and either enables or blocks the battery depending upon whether the match succeeds or fails (309).

In this process, the public key stored in the system functions as a first encryption element, with the private key stored in the semiconductor device 207 functions as a second encryption element. The first encryption element is exercised by code stored in the system accessibly to the processor and causing the processor when executing the code to perform the encryption and storing described.

In the drawings and specifications there has been set forth a preferred embodiment of the technology and, although specific terms are used, the description thus given uses terminology in a generic and descriptive sense only and not for purposes of limitation.

What is claimed is:

1. Method comprising:
    storing a plurality of digitally encoded number strings in an electronic device which has a first cryptographic element and which accommodates line and battery power;
    coupling to the electronic device a battery which has a second cryptographic element;
    exchanging encrypted messages derived from one of the number strings between cooperating first and second cryptographic elements wherein a matched exchange enables the electronic device to recognize the battery and exchange electrical power with the recognized battery; and
    supporting a plurality of power states in the electronic device;
    wherein the exchanging of encrypted messages between cooperating first and second cryptographic elements is in response to a transition from one power state of the electronic device to another power state of the electronic device.

2. Method according to Claim I wherein a failure of a matched exchange enables the electronic device to block exchange of electrical power with an unrecognized battery.

3. Method according to claim 1 wherein the storing of a plurality of number strings comprises;
    generating an encrypted number string with the first encryption element from each of a plurality of unencrypted number strings; and
    storing the plurality of encrypted number strings.

4. Method according to claim 1 wherein the exchanging of encrypted messages is an asymmetric exchange of a challenge and response between paired public and private keys exercised in the first and second encryption elements and further comprising determining a matched exchange by the response returned to a challenge.

5. Method according to claim 1 wherein:
    the storing of a plurality of number strings comprises;
    generating an encrypted number string with the first encryption element from each of a plurality of unencrypted number strings; and
    selecting from among the plurality of stored encrypted number strings differing ones of the encrypted number strings to be used in successive transitions from one power state to another power state.

6. Method according to claim 1 wherein:
    the storing of a plurality of digitally encoded number strings occurs in a computer system; and comprises;
    generating an encrypted number string from each of a plurality of unencrypted number strings with code embedded as the first encryption element; and
    thereafter storing the plurality of encrypted number strings.

7. Method according to claim 6 wherein the exchanging of encrypted messages is an asymmetric exchange of a challenge and response between paired public and private keys exercised in the first and second encryption elements and further comprising determining a matched exchange by the response returned to a challenge.

8. Method according to claim 6 wherein
    the exchanging of encrypted messages between cooperating first and second cryptographic elements is in response to a transition from one power state of the computer system to another power state of the computer system.

9. Apparatus comprising:
    an electronic device accommodating line and battery power and incorporating a first cryptographic element and digital memory;
    a plurality of digitally encoded number strings stored in said electronic device digital memory;
    a battery which can be coupled to and exchange power with said electronic device and incorporating a second cryptographic element;
    said first and second cryptographic elements cooperating to exchange encrypted messages derived from one of the number strings so that a matched exchange enables the electronic device to recognize a coupled battery and exchange electrical power with the recognized battery; and
    supporting a plurality of power states in the electronic device;
    wherein the exchanging of encrypted messages between cooperating first and second cryptographic elements is in response to a transition from one power state of the electronic device to another power state of the electronic device.

10. Apparatus according to claim 9 wherein a failure of a matched exchange enables the electronic device to block exchange of electrical power with a coupled battery which is unrecognized.

11. Apparatus according to claim 9 wherein said electronic device further comprises a processor communicating with said memory and code stored in said electronic device and effective when executing on said processor to;
    store a plurality of unencrypted number strings;
    generate an encrypted number string from each of the plurality of unencrypted number strings; and
    store the plurality of encrypted number strings.

12. Apparatus according to claim 9 wherein the exchanging of encrypted messages between said electronic device and said coupled battery is an asymmetric exchange of a challenge and response between paired public and private keys exercised in the first and second encryption elements and further wherein a matched exchange is determined by the response returned to a challenge.

13. Apparatus according to claim 9 wherein said electronic device further comprises a processor communicating with said digital memory and code stored in said electronic device and effective when executing on said processor to:
   store a plurality of unencrypted number strings;
   generate an encrypted number string from each of the plurality of unencrypted number strings;
   store the plurality of encrypted number strings; and
   respond to a transition of the electronic device from one power state of the electronic device to another power state of the electronic device by initiating an exchange of encrypted messages; and
   select from among the plurality of stored encrypted number strings differing ones of the encrypted number strings to be used in exchanges initiated on successive transitions from one power state to another power state.

14. Apparatus according to claim 9 wherein;
   said digital memory stores a plurality of unencrypted number strings;
   said electronic device is a computer system comprising a processor and code stored accessibly to said processor;
   said processor when executing said code generating an encrypted number string from each of the plurality of unencrypted number strings and storing in said digital memory the plurality of encrypted number strings.

15. Apparatus according to claim 14 wherein:
   said first and second cryptographic elements exchange encrypted messages in an asymmetric exchange of a challenge and response between paired public and private keys exercised in said first and second encryption elements and further wherein said processor determines a matched exchange by the response returned to a challenge.

16. Apparatus according to claim 14 wherein
   said computer system supports a plurality of power states;
   said processor while executing said code:
   stores a plurality of unencrypted number strings;
   generates an encrypted number string from each of the plurality of unencrypted number strings;
   stores the plurality of encrypted number strings; and
   responds to a transition of the electronic device from one power state to another power state by initiating an exchange of encrypted messages; and
   selects from among the plurality of stored encrypted number strings differing ones of the encrypted number strings to be used in exchanges initiated on successive transitions from one power state to another power state.

* * * * *